United States Patent
Miguez Charines et al.

(10) Patent No.: US 10,315,360 B2
(45) Date of Patent: Jun. 11, 2019

(54) MANUFACTURING METHOD OF COMPOSITE STRUCTURES WITH CURING TOOLS ARRANGED OUTSIDE THE VACUUM BAG

(71) Applicant: Airbus Operations S.L., Getafe (ES)

(72) Inventors: Yolanda Miguez Charines, Getafe (ES); Francisco Javier Jordan Carnicero, Getafe (ES); Augusto Perez Pastor, Getafe (ES); Angel Pablo Gordo, Getafe (ES); Laura Alvarez Antonon, Getafe (ES)

(73) Assignee: Airbus Operations S.L., Getafe (ES)

( * ) Notice: Subject to any disclaimer, the term of this patent is extended or adjusted under 35 U.S.C. 154(b) by 211 days.

(21) Appl. No.: 15/141,150

(22) Filed: Apr. 28, 2016

(65) Prior Publication Data
US 2016/0318238 A1 Nov. 3, 2016

(30) Foreign Application Priority Data
Apr. 30, 2015 (EP) .................................. 15382220

(51) Int. Cl.
*B32B 27/00* (2006.01)
*B29C 65/02* (2006.01)
(Continued)

(52) U.S. Cl.
CPC .............. *B29C 65/02* (2013.01); *B29C 65/72* (2013.01); *B29C 70/44* (2013.01);
(Continued)

(58) Field of Classification Search
CPC ......... B29C 65/02; B29C 65/72; B29C 70/44; B29C 70/021; B29C 43/12; B29D 99/001–0017; B29D 99/0025; B29L 2031/3085
See application file for complete search history.

(56) References Cited

U.S. PATENT DOCUMENTS 5,071,338 A * 12/1991 Dublinski ............. B29C 33/307
156/382
6,508,909 B1 * 1/2003 Cerezo Pancorbo ... B29C 70/44
156/306.6
(Continued)

FOREIGN PATENT DOCUMENTS

DE   102007004313 A1 * 7/2008 ............. B29C 70/44
EP        2508326        10/2012
(Continued)

OTHER PUBLICATIONS

European Search Report, dated Oct. 26, 2015, priority document.

*Primary Examiner* — William P Bell
*Assistant Examiner* — Andrew L Swanson
(74) *Attorney, Agent, or Firm* — Greer, Burns & Crain, Ltd.

(57) ABSTRACT

A manufacturing method of structures formed co-bonding second structural components to a first structural component. The method comprises the following steps: a) preparing for each second structural component an ensemble wherein a preform of the second structural component, surrounded by a band of a suitable material to form a vacuum bag, is disposed between curing tools which are thus in contact with the bag and not with the preform; b) positioning the ensembles on the first structural component and forming the vacuum bag for the complete structure joining the bands and complementary pieces; c) applying to the resulting assembly an autoclave cycle.

8 Claims, 3 Drawing Sheets

(51) Int. Cl.
  *B29C 65/72* (2006.01)
  *B29C 70/44* (2006.01)
  *B29D 99/00* (2010.01)
  *B29L 31/30* (2006.01)
  *B29C 70/34* (2006.01)
  *B29C 70/02* (2006.01)
  *B29C 70/54* (2006.01)
  *B29C 43/12* (2006.01)

(52) U.S. Cl.
  CPC .......... *B29D 99/0014* (2013.01); *B29C 43/12* (2013.01); *B29C 70/021* (2013.01); *B29C 70/34* (2013.01); *B29C 70/342* (2013.01); *B29C 70/443* (2013.01); *B29C 70/543* (2013.01); *B29L 2031/3085* (2013.01)

(56) References Cited

U.S. PATENT DOCUMENTS

| | | | |
|---|---|---|---|
| 7,270,722 B2 * | 9/2007 | Navas | B29C 70/345 156/212 |
| 8,182,640 B1 * | 5/2012 | Boone | B29C 65/48 156/285 |
| 2002/0144401 A1 * | 10/2002 | Nogueroles Vines | B29C 70/342 29/897.2 |
| 2011/0315307 A1 * | 12/2011 | Perez Pastor | B29C 70/446 156/242 |
| 2012/0258276 A1 * | 10/2012 | Modin | B29C 70/342 428/98 |
| 2013/0149164 A1 * | 6/2013 | Hansen | B64C 3/185 416/226 |
| 2014/0352877 A1 | 12/2014 | Fernandez Alonso et al. | |
| 2014/0374013 A1 * | 12/2014 | Hansen | B29C 33/307 156/243 |
| 2015/0174831 A1 | 6/2015 | Modin | |

FOREIGN PATENT DOCUMENTS

| | | | |
|---|---|---|---|
| EP | 2808147 | 12/2014 | |
| EP | 2851283 | 3/2015 | |
| WO | 2010143212 | 12/2010 | |
| WO | WO-2010143212 A1 * | 12/2010 | ............ B29C 70/34 |
| WO | 2014001593 | 1/2014 | |

* cited by examiner

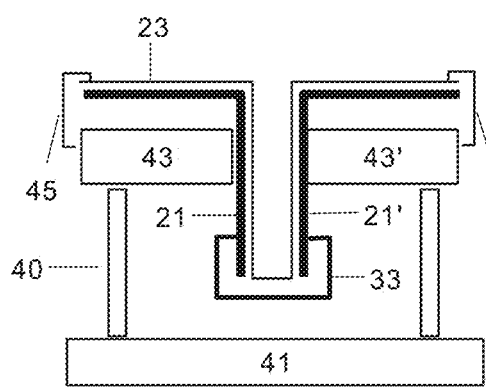
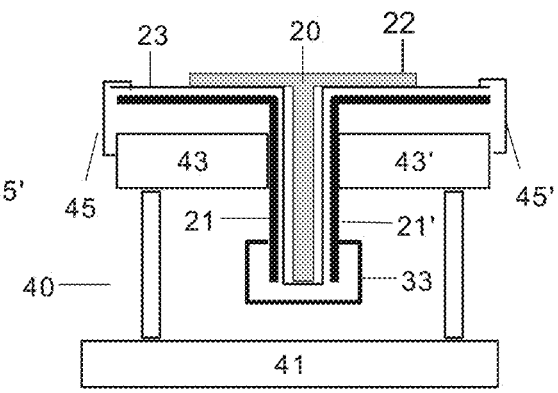
FIG. 2a  FIG. 2b
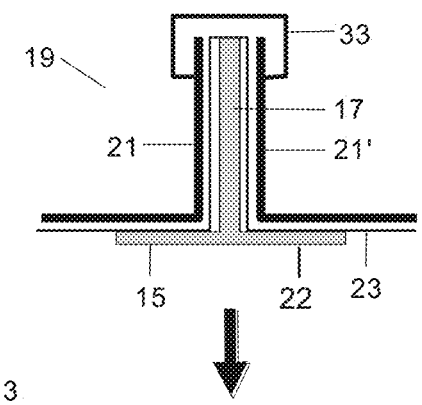
FIG. 2c
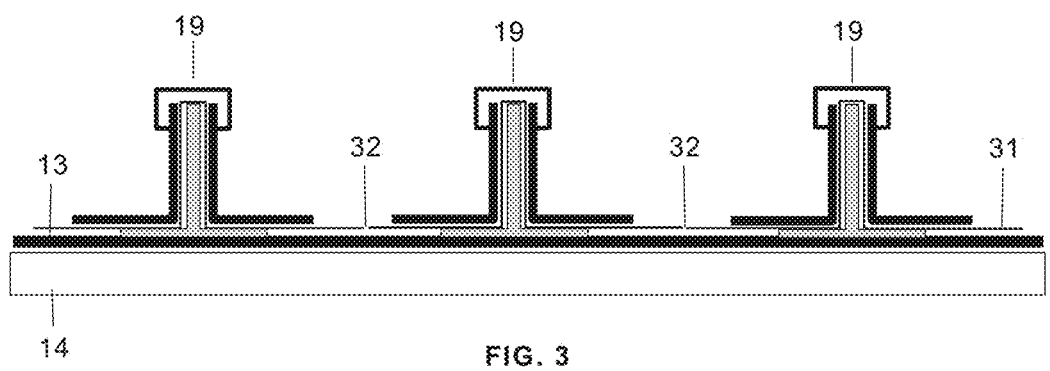
FIG. 3

MANUFACTURING METHOD OF COMPOSITE STRUCTURES WITH CURING TOOLS ARRANGED OUTSIDE THE VACUUM BAG

CROSS-REFERENCES TO RELATED APPLICATIONS

This application claims the benefit of the European patent application No. 15382220.0 filed on Apr. 30, 2015, the entire disclosures of which are incorporated herein by way of reference.

FIELD OF THE INVENTION

The present invention relates to a method for manufacturing structures of composite materials such as stiffened panels with curing tools arranged outside the vacuum bag.

BACKGROUND OF THE INVENTION

For the manufacture of stiffened panels of composite materials such as those used in aircraft lifting surfaces co-bonding methods are known wherein stiffening elements in uncured state are joined to a skin in cured state as well as secondary co-bonding and co-curing methods.

In the co-bonding known methods of such panels curing tools in direct contact with the stiffening elements are used and, although satisfactory results are generally obtained, some problems such as the so-called "Mexican hat" concerning T-shaped stiffeners, the lack of uniformity of the co-bonding line and the presence in the foot of the stringers close to curing tools of non-working areas, cannot be avoided.

The present invention is directed to solving these problems.

SUMMARY OF THE INVENTION

The invention provides a manufacturing method of a composite structure formed joining by co-bonding to a first structural component such as the skin of the cover of an aircraft wing second structural components such as stiffening stringers.

The basic features of the method are the following:
preparing for each second structural component (stringer) an ensemble wherein a preform of it, surrounded by a band of a suitable material to form a vacuum bag—as if it were a single vacuum bag for each stringer—, is disposed between curing tools which are therefore in contact with the bag and not with the preform;
b) positioning the ensembles on the first structural component (skin) and forming the vacuum bag for the structure joining the bands and complementary pieces;
c) applying to the resulting assembly an autoclave cycle to perform the co-bonding of the second structural components (stringers) to the first structural component (skin).

Advantageously the bands and the complementary pieces of a suitable material for the formation of a vacuum bag comprise an impervious plastic film, a separating film, whether peelable or having a matte finish on its inner face, and an aerator tissue arranged between the two films of lower density than the aerator tissues used in vacuum bags that are not in direct contact with composite parts in uncured state.

In an embodiment with T-shaped second structural components (stringers) the curing tools are two angular profiles and the complementary pieces comprise first complementary pieces of the same width as the bands that are disposed after them and second complementary pieces to cover edge areas.

In one embodiment, the bands and the first complementary pieces have two sealing tapes applied at its side edges so as to enable its union during the positioning step of the ensembles.

Other characteristics and advantages of the present invention will be clear from the following detailed description of embodiments illustrative of its object in relation to the attached drawings.

BRIEF DESCRIPTION OF THE DRAWINGS

FIGS. 2a-2b are schematic elevation views illustrating the fundamental steps of the preparation stage of ensembles in which preforms of the second structural elements surrounded by bands of a suitable material for forming a vacuum bag are disposed between curing tools and FIG. 2c is a schematic elevation view illustrating the positioning of the ensembles on the first structural component.

FIG. 3 is a partial schematic elevation view of the composite structure illustrating the step of the manufacturing method in which the vacuum bag covering the structure is formed joining different bands and complementary pieces of a suitable material for forming a vacuum bag.

DETAILED DESCRIPTION OF THE PREFERRED EMBODIMENTS

Figure 1:
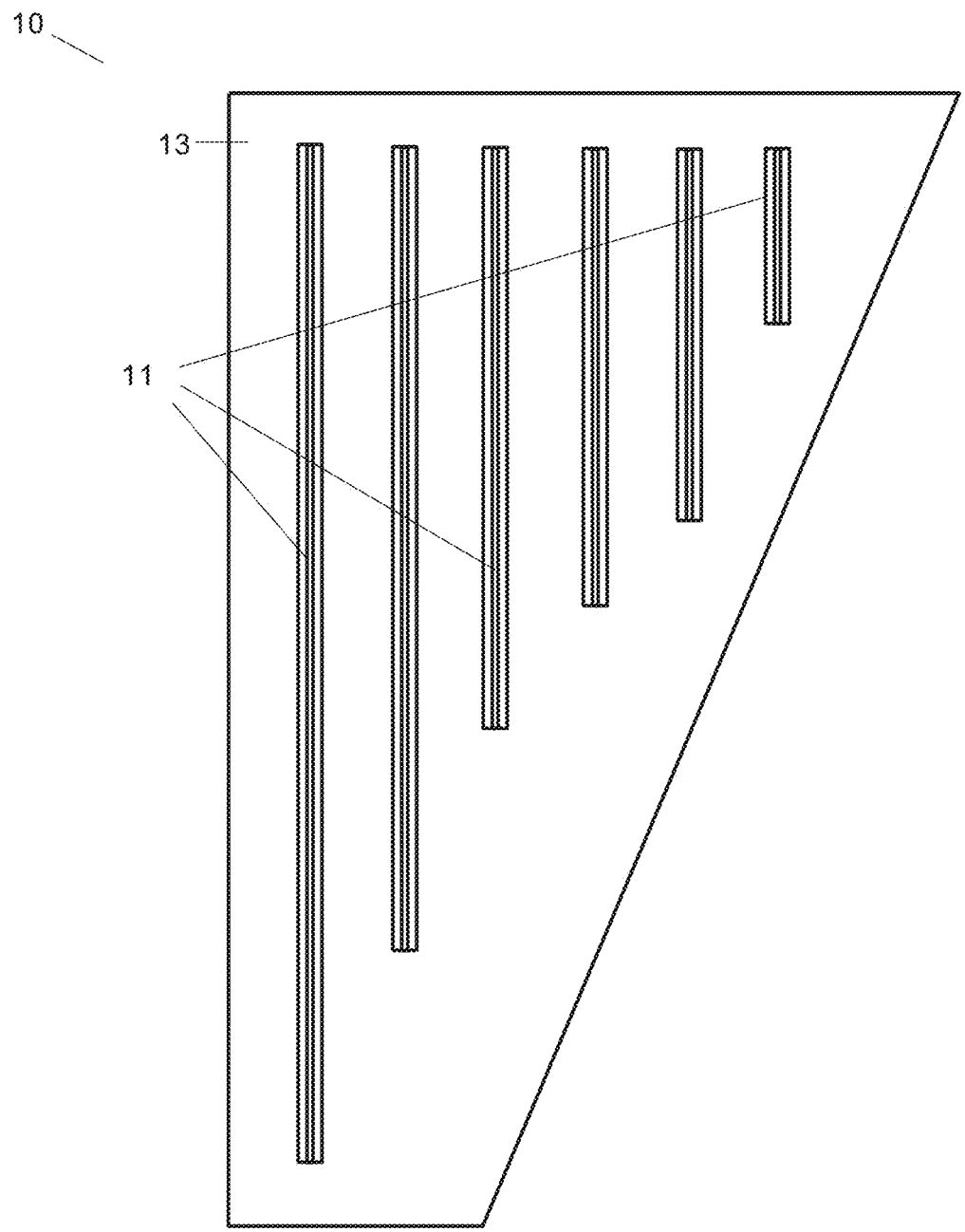
FIG. 1 is a schematic plan view of a composite structure such as the cover of an aircraft wing in which a plurality of second structural elements (stringers) are co-bonded to a first structural component (skin).

A manufacturing method according to the invention of a structure 10 such as a cover of an aircraft wing (see FIG. 1) formed by a skin 13 of composite (the first structural component) stiffened by T-shaped stringers 11 of composite (the second structural components) will now be described.

The basic stages of the method are the following:
a) Preparation of an ensemble 19 (see FIG. 2c) for each stringer 11 in which a preform 20 of it (manufactured by a hot forming process) wrapped, except for the base of the foot 15, by a band 23 of a suitable material for forming a vacuum bag, is arranged between curing tools 21, 21' configured by angular profiles made of steel or INVAR provided with clamps 33 that can regulate the distance between them so that they can be in three positions: opened, intermediate and closed.

This stage may be performed using an equipment 40 comprising supporting modules 43, 43' of the ensemble 19 resting on a beam 41, which in turn support fixing devices 45, 45' of the lateral edges of the band 23 to the curing tools 21, 21'.

In a first step (see FIG. 2a), the band 23 is placed on the curing tools 21, 21' and fixed to them by its lateral edges by the fixing devices 45, 45'.

In a second step (see FIG. 2b) the preform 20 is placed within the band 23. By keeping the lateral edges of the band 23 fixed to the curing tools 21, 21' during placement of the preform 20, alignment of the band 23 with the web 17 of the preform 20 is guaranteed. After placement of the preform 20, an adhesive layer 22 is placed on a foot 15 of the preform.

In the previous steps clamps 33 are kept in the opened position and at the end of the second step are changed to the intermediate position.

Figures 4, 5:
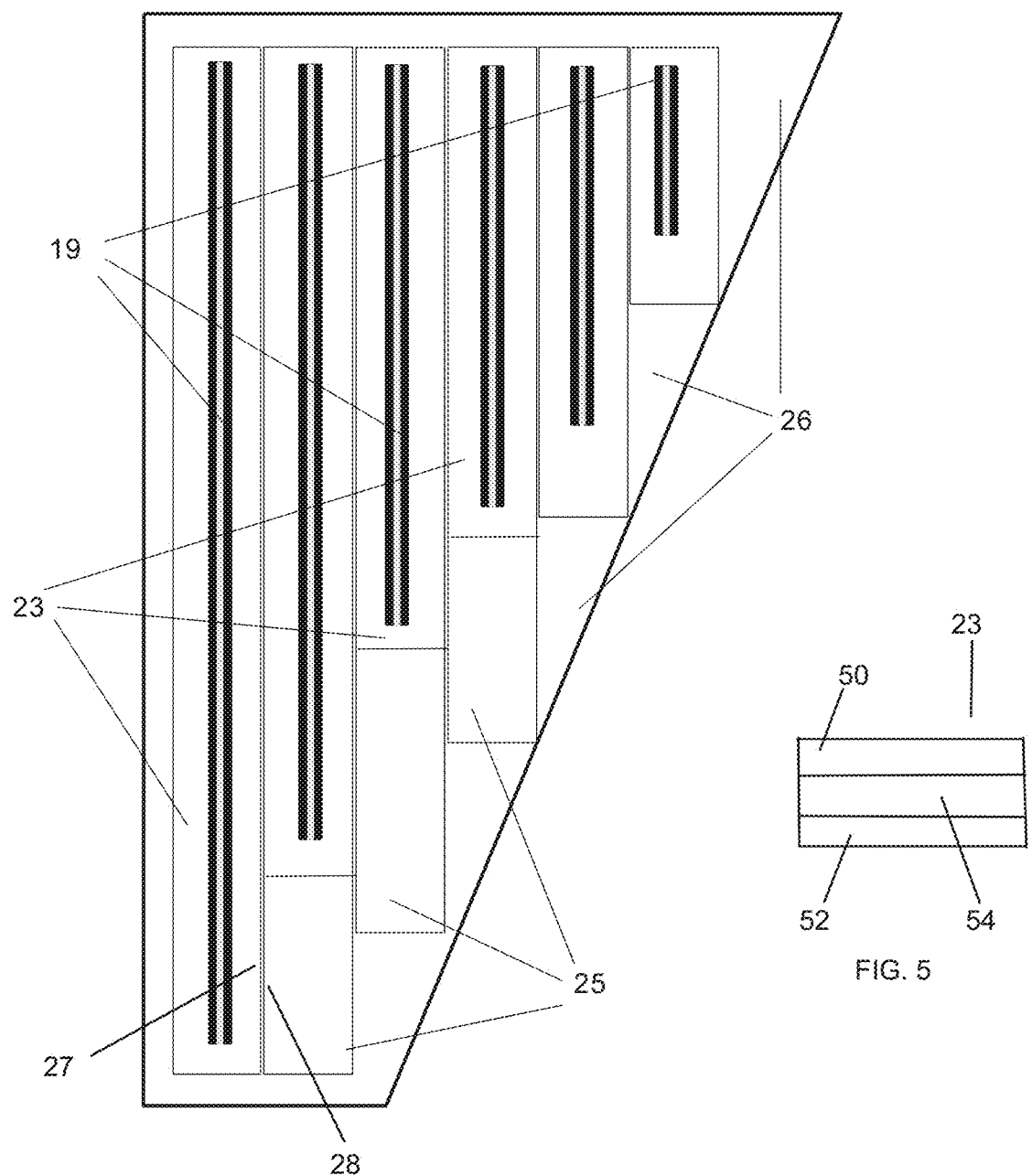
FIG. 4 is a schematic plan view of the composite structure before subjecting it to the autoclave cycle illustrating in particular the bands and pieces with which the vacuum bag is formed.
FIG. 5 is a partial side view of the bands showing their film and tissue construction.

In this stage it is achieved that the bands 23 are adapted to the geometry of the preforms 20 avoiding the so called "bridges" that can cause breakage of the vacuum bag during the autoclave cycle.

b) Positioning of the ensembles 19 on the skin 13 (in a cured state) so that the adhesive layer 22 of the feet 15 of the preforms 20 can contact with the skin 13 perform the co-bonding of the preforms 20 to the skin 13 and forming a vacuum bag 31 for the whole assembly by joining the bands 23 of each ensemble 19 and first and second complementary pieces 25, 26 of the same material as bands 23 to cover the whole skin 13 (see FIGS. 3 and 4). The first complementary pieces 25 are continuations of the bands 23 for those ensembles 19 whose preforms 20 do not extend to the entire available length of the skin 13 and the second supplementary pieces 26 are those required to complete the vacuum bag 31 that covers all the skin 13.

This stage requires moving the equipment 40 to a workstation on which the skin 13 (in a cured state) is located on a mold 14 and, once it is positioned on the envisaged location for each preform 20, rotating it 180 degrees (about a horizontal axis) and moving it vertically to deposit the ensemble 19 onto the skin 13 (see FIG. 2c).

After placing the ensembles 19 over the skin 13, the vacuum bag 31 is formed joining the bands 23 and the first complementary pieces 25 for each preform 20 by side edges of the bands and the first complementary pieces. For this purpose, in the embodiment of the invention we are describing, the bands 23 and first complementary pieces 25 carry on their side edges sealing tapes 27, 28.

With this arrangement and suitable dimensioning of the bands 23 and the first complementary pieces 25, one of the edges of the first complementary pieces may have the sealing tape 28 on an upper side (relative to the skin 13) so that by placing a contiguous band 23 with the sealing tape 27 on a lower side, both sealing tapes are facing each other forming joining areas 32 (see FIG. 3) which only need the application of a slight pressure (by means of, for example, a roller) to be joined.

As shown in FIG. 5, the bands 23 and the first and second complementary pieces 25, 26 comprise a film 50 of an impervious plastic material, a separator film 52 to be in contact with the preform 20 as auxiliary material and an aerator tissue 54 disposed between the two films. The auxiliary materials 52 are different from those used in vacuum bags that are not in direct contact with non-cured parts because the surface finishing of these parts depends on the nature of the auxiliary materials. In particular, the separator film 52 must have a matte finish or be peelable and the aerator tissue 54 should have a lower density than those aerator tissues used when they are not in direct contact with composite parts in uncured state, to fit well to the radii.

c) Applying an autoclave cycle to the assembly resulting from the previous stage to perform the co-bonding of the second structural components 11 to the first structural component 13.

At this stage the clamps 33 are in the closed position to apply pressure to the web 17 of the preforms 20.

Advantages of the invention include the following:

The problems mentioned in the Background: "Mexican hat," lack of uniformity of the co-bonding line and non-working area at the foot of the stringers are eliminated. The uniformity of the co-bonding line and the dimensional quality of the final structure, especially of the stringers by decreasing the "dead zone" of their foot, are ensured.

The geometry of the curing tools 21, 21' is greatly simplified because they do not mold the preforms 20 of the stringers. Their basic functions are preventing the deviation of their webs from the vertical plane and helping the vacuum bag matching, as closely as possible, to the radius of the stringer. It is not necessary that they cover the top of the web.

The curing tools 21, 21' can be made of steel instead of INVAR which implies a lower cost.

Although the present invention has been described in connection with various embodiments, it will be appreciated from the specification that various combinations of elements, variations or improvements therein may be made, and are within the scope of the invention as defined by the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a structure of composite material formed by a first structural component and a plurality of second structural components, joining the second structural components in an uncured state to the first structural component in a cured state by co-bonding, comprising the following steps:
   a) for each second structural component, placing a band of a suitable material to form a vacuum bag on two spaced apart curing tools, and fixing lateral ends of the bands to one of the two spaced apart curing tools, the bands being dimensioned so as to extend beyond all edges of the second structural components,
   b) placing an ensemble formed by a preform of each of the second structural components between the curing tools to form an assembly, so that the preform is surrounded by the vacuum bag material, except a surface of the preform to be joined to the first structural component, the placing being arranged such that the surface of the preform to be joined to the first structural component faces upwards and wherein the band is between the preform and the two spaced apart curing tools,
   c) placing an adhesive layer for the co-bonding on the surface of the preform to be joined to the first structural component;

d) rotating the assemblies of the curing tools and the preforms 180 degrees about a horizontal axis, so that the surface of the preform to be joined to the first component faces downwards, e) placing the ensembles of the second structural components on an upward facing surface of the first structural component in areas foreseen for their attachment, such that adjacent bands overlap one another, f) forming a vacuum bag joining the bands of each second structural component to adjacent bands, g) adding complementary pieces of the same material as the bands to areas of the upward facing surface of the first structural component that are not covered by the bands, such that the complementary pieces overlap and join to the bands or each other, forming an enlarged vacuum bag, so that the enlarged vacuum bag covers entirely the upward facing surface of the first structural component;

h) applying an autoclave cycle to the assembly resulting from the previous step for performing the co-bonding of the second structural components to the first structural component.

2. A method according to claim 1, wherein said preforms are made by a hot forming process.

3. A method according to claim 1, wherein said bands and said complementary pieces of a suitable material for forming a vacuum bag comprise an impervious plastic film, a separating film on an inner surface of the impervious plastic film and an aerator tissue disposed between the two films, the separating film being one of peelable or having a matte finish.

4. A method according to claim 1, wherein:
said second structural components are T-shaped and are attached to the first structural component by a foot;
said curing tools are two angular profiles adapted to a shape of the second structural components;
said complementary pieces comprise first complementary pieces of a same width as the bands of the second structural components and that are arranged as continuations of the bands, and second complementary pieces to cover edge regions of the upward facing surface of the first structural component.

5. A method according to claim 1, wherein:
said bands and said first complementary pieces have two sealing tapes applied at side edges of the bands and the first complementary pieces; and
the contiguous bands and first complementary pieces are arranged so that in their adjacent edges, faces of each band and first complementary piece having a sealing tape are in contact to facilitate a union between the band and the first complementary piece.

6. A method according to claim 1, wherein in step a) the bands are placed with lateral edges of the bands fixed to the curing tools to ensure proper alignment of the bands during the placement of the preforms.

7. A method according to claim 1, wherein:
in step a) the curing tools are arranged at a distance which facilitates insertion of the preforms;
in step d) the curing tools are arranged at a distance that allows for retention of the preforms located between the curing tools;
in step h) the curing tools are arranged at a distance allowing the application of a predetermined pressure to the preforms located between the curing tools.

8. A method according to claim 1, wherein said structure is a cover of an aircraft wing, the first structural component being the skin and the second structural components being reinforcing longitudinal stringers.

* * * * *